(12) United States Patent
Bourque

(10) Patent No.: US 8,199,731 B2
(45) Date of Patent: Jun. 12, 2012

(54) METHOD AND APPARATUS FOR FACILITATING SWITCHED PACKET DATA SERVICES ON MULTIPLE NETWORKS

(75) Inventor: Francis P. Bourque, Mundelein, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1210 days.

(21) Appl. No.: 11/339,763

(22) Filed: Jan. 25, 2006

(65) Prior Publication Data

US 2007/0171879 A1 Jul. 26, 2007

(51) Int. Cl.
*H04W 4/00* (2009.01)

(52) U.S. Cl. ............. 370/338; 370/329; 455/435.2

(58) Field of Classification Search .............. 370/338, 370/329, 346; 455/435.1, 435.2, 435.3
See application file for complete search history.

(56) References Cited

U.S. PATENT DOCUMENTS

| | | | | |
|---|---|---|---|---|
| 5,347,271 | A * | 9/1994 | Iwasaki | 370/218 |
| 6,151,628 | A * | 11/2000 | Xu et al. | 709/225 |
| 6,711,172 | B1 * | 3/2004 | Li | 370/401 |
| 6,876,654 | B1 * | 4/2005 | Hegde | 370/392 |
| 7,219,160 | B1 * | 5/2007 | Buchsbaum et al. | 709/242 |
| 7,363,233 | B1 * | 4/2008 | Levine | 705/1 |
| 7,467,227 | B1 * | 12/2008 | Nguyen et al. | 709/239 |
| 7,649,866 | B2 * | 1/2010 | Chari et al. | 370/331 |
| 2001/0036823 | A1 | 11/2001 | Van Lieshout et al. | |
| 2002/0034173 | A1 * | 3/2002 | Border et al. | 370/338 |
| 2002/0145104 | A1 * | 10/2002 | Klinker et al. | 370/244 |
| 2003/0020651 | A1 * | 1/2003 | Crilly et al. | 342/378 |
| 2003/0110284 | A1 * | 6/2003 | Nun | 709/236 |
| 2003/0169749 | A1 * | 9/2003 | Huang et al. | 370/401 |
| 2003/0224787 | A1 * | 12/2003 | Gandolfo | 455/434 |
| 2004/0017798 | A1 * | 1/2004 | Hurtta et al. | 370/352 |
| 2004/0028203 | A1 | 2/2004 | Wurster et al. | |
| 2004/0179527 | A1 * | 9/2004 | Cypher | 370/392 |
| 2005/0059397 | A1 * | 3/2005 | Zhao | 455/435.2 |
| 2005/0129022 | A1 * | 6/2005 | Mugica et al. | 370/392 |
| 2005/0249238 | A1 * | 11/2005 | Haumont | 370/466 |
| 2006/0067246 | A1 * | 3/2006 | Moon | 370/252 |
| 2006/0221866 | A1 * | 10/2006 | Shepherd | 370/255 |
| 2006/0234705 | A1 * | 10/2006 | Oommen | 455/435.3 |
| 2006/0258356 | A1 * | 11/2006 | Maxwell et al. | 455/436 |
| 2007/0097973 | A1 * | 5/2007 | Scudder et al. | 370/392 |
| 2008/0205392 | A1 * | 8/2008 | Danzeisen et al. | 370/389 |
| 2009/0098877 | A1 * | 4/2009 | Chaudry et al. | 455/445 |
| 2010/0014537 | A1 * | 1/2010 | Jacquet et al. | 370/411 |
| 2010/0111091 | A1 * | 5/2010 | Adams et al. | 370/395.53 |

* cited by examiner

*Primary Examiner* — Christopher M Brandt

(74) *Attorney, Agent, or Firm* — Lawrence J. Chapa

(57) ABSTRACT

A method and apparatus for establishing data connections between multiple networks is provided. A portable, electronic device 300, such as a mobile telephone, includes a communication module 303 configured to initiate the data connection by transmitting an initiation request. The device 300 establishes the data connection, which may be a packet data protocol-context data connection in a general packet radio service environment, by transmitting an initiation request that includes a network identifier such as access point name to obtain an Internet protocol address. Upon determining available network channels suitable for establishment of the network connection, a processing module 304 selects a corresponding network identifier from a look-up table 305 of network identifiers and corresponding networks. The communication module 303 then transmits the data connection initiation request having the selected network identifier so as to establish a switched packet data connection with the selected network.

21 Claims, 3 Drawing Sheets

| Network Channel | Requested APN |
|---|---|
| 1 | wap.telco.com |
| 2 | internet.telco.com |
| ⋮ | ⋮ |
| N | 123.321.1.1 |

METHOD AND APPARATUS FOR FACILITATING SWITCHED PACKET DATA SERVICES ON MULTIPLE NETWORKS

BACKGROUND

1. Technical Field

This invention relates generally to a method and apparatus for providing switched packet data services between an electronic device and a network, and more particularly to a method and apparatus for enabling switched packet data transfer between the electronic device and one of a plurality of networks.

2. Background Art

In recent years, mobile telephones have enjoyed explosive growth in popularity. Once a luxury for only a few, today millions of people use mobile telephones to stay connected with friends, family, and coworkers. Coupled with the rise in popularity of mobile telephones has been an improvement in wireless communications networks. Older, analog systems have given way to new digital technologies and high capacity communication networks. Communication systems like Code Duplex Multiple Access (CDMA) and Global Systems for Mobile Devices (GSM) offer mobile telephone users reliable voice connections around the world.

In addition to voice communication, many mobile phones today are capable of exchanging packet data. For instance, phones capable of working in General Packet Radio Service (GPRS) systems are capable of exchanging packets of data between the mobile phone and a wireless network. General packet radio service devices, in addition to serving as traditional mobile telephones, are capable of exchanging text messages, pictures and sounds across the network. They are also capable of connecting to the Internet and World Wide Web.

While many wireless wide area network service providers offer switched packet data service through their cellular networks, the data transfer rates can be slow. Some service providers also charge additional fees for switched packet data service. Additionally, on occasion, the wide area network may be temporarily out of service. When any of these situations arises, it would be advantageous for a device to be able to establish a switched packet data connection with an alternate network. For example, if a wireless local area network (WLAN) were present, a device may be able to obtain higher transfer rates or functioning connections by transferring data with the wireless local area network rather than with the wide area network. Further, as base station transceivers in wireless local area networks are typically closer to a device than in wide area networks, battery power may be saved during communication with wireless local area networks as device transmission power can be reduced.

The problem with accomplishing this is that general packet radio service devices are generally configured to obtain data connections only from a service provider. In other words, in a general packet radio service system an electronic device establishes a switched packet data connection with what is known as a packet data protocol (PDP) context connection. The device, or an application within the device, does this by sending a packet data protocol-context initiation request to a servicing general packet radio service support node (SGSN). The request includes a service provider's programmed access point name (APN). A gateway general packet radio service support node (GGSN) then requests a dynamic Internet protocol (IP) address for the device. The gateway general packet radio service support node then assigns this dynamic IP address to the device so that a switched packet data connection may be established.

Therefore, unless the wireless local area network to which the device would like to connect includes a general packet radio service subnetwork that operates in conjunction with a service provider's access point name, the general packet radio service device will be unable to connect to the wireless local area network. There is thus a need for a method and apparatus for an electronic device, like a general packet radio service radiotelephone for example, to be able to establish switched packet data connections with alternate networks.

Figure 1:
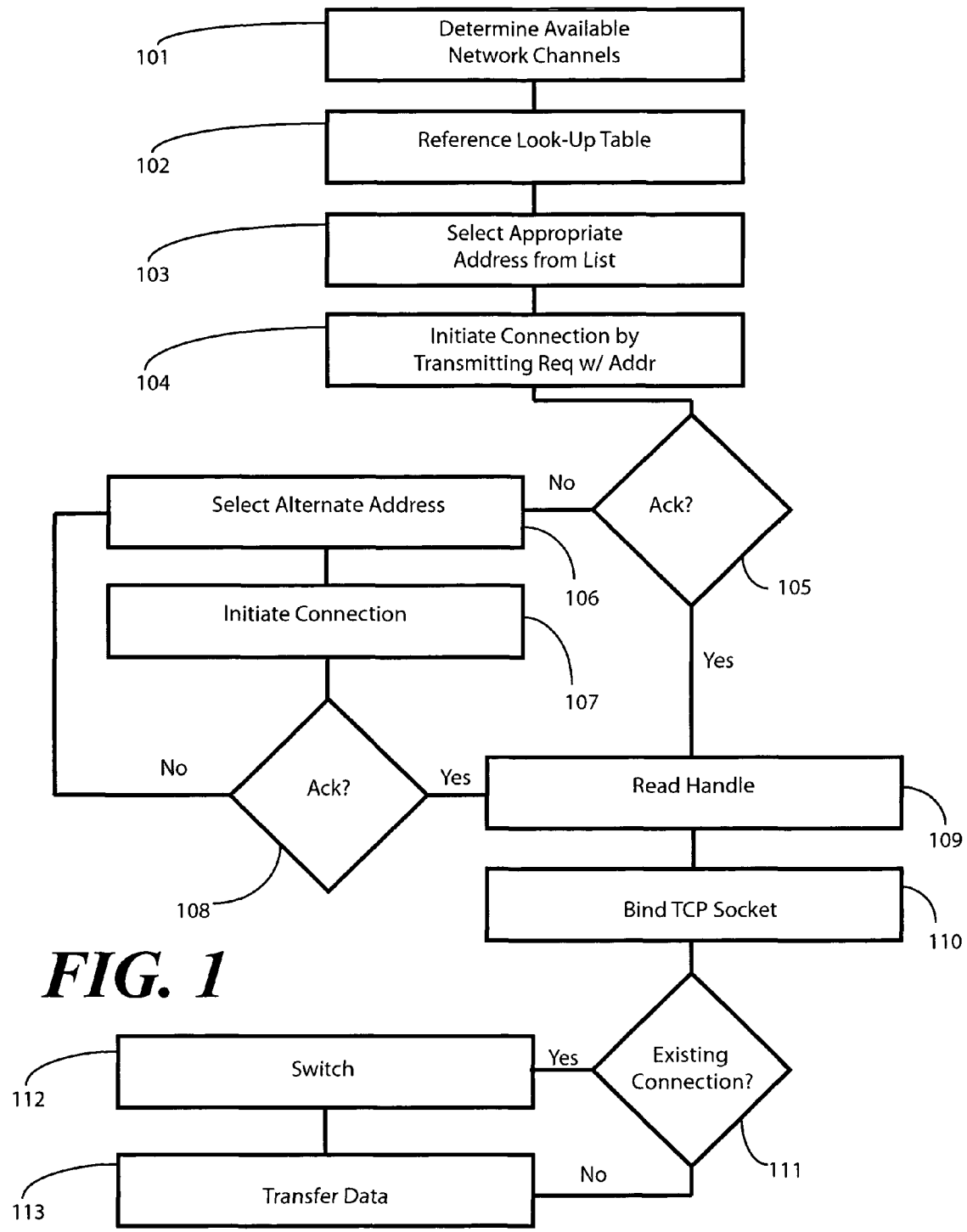
FIG. 1 illustrates a method for establishing a packet data communications connection through a data path selected from a plurality of available data paths in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to facilitating switched packet data connections with multiple networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of establishing switched packet data connections as described herein. The non-processor circuits may include, but are not limited to, a radio receiver, a radio transmitter, signal drivers, clock circuits, power source circuits, and user input devices. As such, these functions may be interpreted as steps of a method to establish switched packet data connections with multiple networks. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

The present invention provides a method and apparatus for a device, like a general packet radio service mobile telephone for example, to establish switched packet data connections with networks other than specific service provider provided, general packet radio service, wide area networks. For example, when an Internet Protocol Multimedia Subsystem (IMS) network that is accessible over a wireless local area network connection is present within the vicinity of the device, the invention allows the device to establish a switched packet data connection with the internet protocol multimedia system over the wireless local area network even though the system is not affiliated with either a service provider or a service provider's access point name programmed into the device.

As noted above, for a device to establish a switched packet data connection by way of a packet data protocol-context connection, the device provides an access point name programmed by a service provider in an initiation request that is transmitted from the device. The gateway general packet radio service support node of the general packet radio service network uses this access point name to determine which data connection channel to use for the packet data protocol-context connection. For instance, if the programmed access point name is "wap.telco.com," the general packet radio service network will ultimately select the appropriate Internet protocol network for the user to use the WAP server. Said differently, the gateway general packet radio service support node will establish a data connection between the device and the appropriate Internet protocol network so that the device may access the WAP server. The general packet radio service support note will then obtain a dynamic address for the device. Continuing with the example above, the Internet protocol address may also be assigned a fully qualified host name such as "device1.telco.com." The gateway general packet radio service support node then assigns this Internet Protocol address to the device using the access point name. Once the device has been assigned the Internet protocol address, the packet data protocol-context connection may be established, thereby allowing the device to exchange data with the WAP server.

As the WAP server may also be reachable over the Internet protocol connection that is provided by one of the wireless local area network access points that may cover a particular location, The pre-programmed access point name is of little use when trying to establish a packet data protocol-context connection with the WAP server over wireless local area network, as the local area network is not affiliated with the service provider's general packet radio service subsystem. This invention thus provides a look-up table that maps various access point names to various networks. As such, when the device attempts to connect to the WAP server (for example) and wireless local area network connectivity is available, rather than transmitting a packet data protocol context initiation request with the service provider's pre-programmed access point name to the gateway general packet radio service support node, the device refers to the look-up table to select an alternate data path that corresponds to the wireless local area network. The process will become clearer in the discussion of the figures that follows.

Turning now to FIG. 1, illustrated therein is a method for establishing a packet data communications connection through a data path selected from a plurality of available data paths. Examples of data paths include a connection through a service provider's Intranet via a virtual private network (VPN) connection established with a security gateway associated with the pre-programmed access point name; a connection through an internet protocol multimedia subsystem over wireless local area network; a connection through a private Intranet or security gateway; a connection through a service provider's Internet connection; a connection through a service provider's Internet connection to a private Intranet or security gateway; a connection with a public Internet; and a tunnel connection with a service provider's security gateway. It will be clear to those of ordinary skill in the art having the benefit of this disclosure that the invention is not so limited. The above network channels are to be exemplary in nature only.

At step 101, the device determines available network channels that are compatible with the communication device. Said another way, the device determines a number and availability of data paths through which the data connection may be established. The device determines which networks and corresponding connections may be available that are compatible with the device's hardware, protocol structure and firmware for establishing a switched packet data connection. For example, the device may detect a wide area network provided by a service provider and a private wireless local area network, either of which would be conducive to establishing a switched packet data connection that is communicationally compatible with the device.

The detection of available network channels may be accomplished in a variety of ways. One exemplary method is by receiving input from a user. If a user has, for example, a wireless local area network suitable for switched packet data exchange at home and another at the office, the user may program his mobile device informing it that these networks are in existence. When the user walks into his home, the user may notify the device that the home wireless local area network is now available.

In the alternative, a "smart" device may automatically detect the presence of available network connections. By way of example, the device may periodically poll the surrounding environment to detect an alternate data path from nearby network gateway nodes. As such, a user may walk into a hotel or airport, and the device may correspondingly detect the presence of a wireless local area network or other network. Where the alternate data path includes associated characteristics such as a particular quality of service, or strength of signal sufficient to sustain various types of switched packet data transfer, the device may store this information in memory. This information may then be used to prioritize the various connections in the look-up table.

Figures 2, 3:
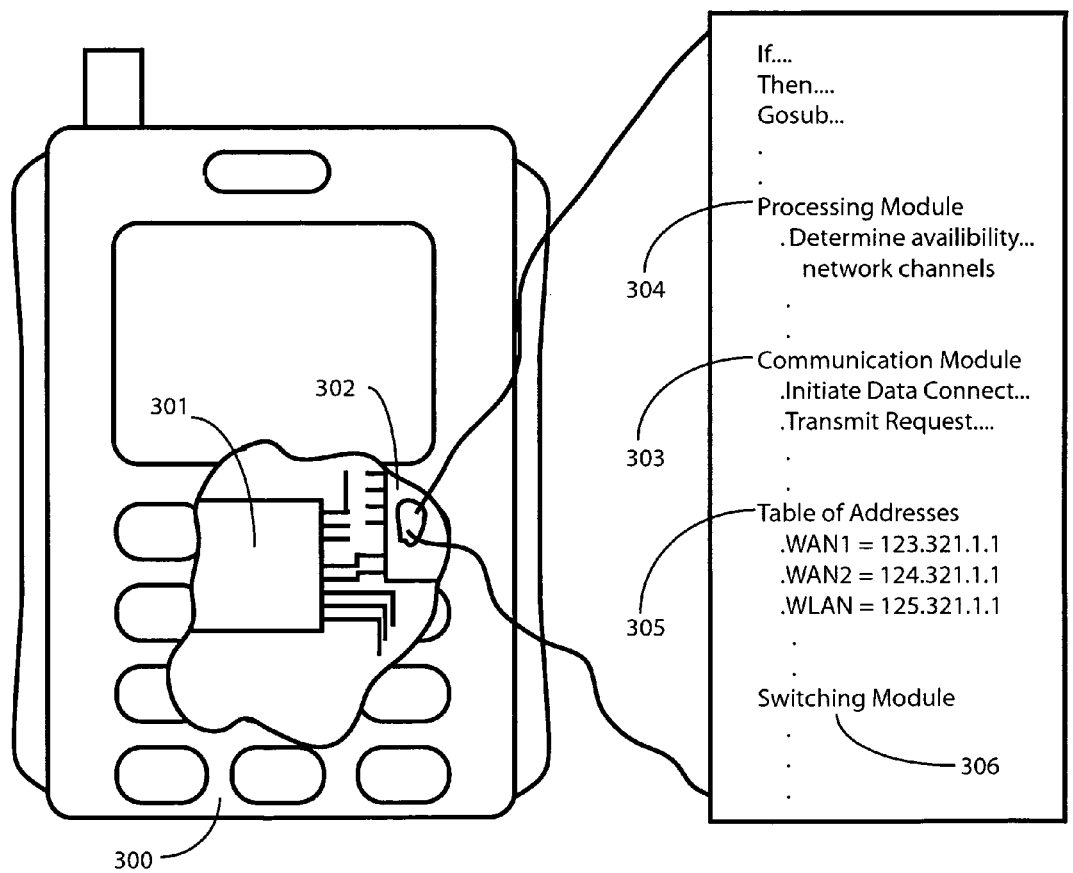
FIG. 2 illustrates one embodiment of a look-up table in accordance with the invention.
FIG. 3 illustrates one embodiment of an electronic device in accordance with the invention.

Once the available network channels have been determined, at step 102 the device references a look-up table, having a plurality of network identification parameters associated with various network channels, when an application within the device requests a data connection. Turning briefly to FIG. 2, illustrated therein is one exemplary look-up table 200.

The look-up table 200 comprises at least a first network identification parameter 201 and a second network identification parameter 202. The first network identification parameter 201 corresponds to a first network channel 203, while the second network identification parameter 202 corresponds to a second network channel 204 and so forth. In other words, the look-up table 200 is a list of identification parameters or network indication addresses (e.g. a plurality of general packet radio service access point names), with each having a corresponding alternate data path associated therewith. Note that a single network channel may include a plurality of data paths, and therefore may include multiple entries in the table.

In the illustrative embodiment of FIG. 2, the network identification parameters 201,202 are access point names. By way of example, the first network identification parameter 201 may be a wide area network general packet radio service access point name, while the second network identification parameter 202 may be a local area network general packet radio service access point name. Examples of networks or data paths that may be associated with the access point names in the table 200 include local area network connection data paths, wireless service provider connection data paths, virtual private network connection data paths, secured gateway connection node data paths, private intranet connection data paths, servicing general packet radio service support node data paths, World Wide Web connection data paths, and Internet connection data paths.

The look-up table 200 may be arranged according to a user-defined priority. For instance, should the user desire when making a switched packet data connection to a network that a home wireless local area network connection always be attempted first, that particular network connection and corresponding network identification parameter might be first in the list. The user may also configure the look-up table such that network connections are arranged by cost of connection, for instance with the lowest cost connection having the highest priority, or by quality of service, for instance where connections having at least a certain quality of service have higher priority than those with lesser qualities of service.

Turning now back to FIG. 1, upon referencing the look-up table (200) in step 102, at step 103, the network indication address corresponding to the available network channels is selected from a list of network indication addresses. As noted above, the selected network indication address or network identification parameter may be selected in a variety of ways. Where the look-up table (200) is arranged in a user-configured priority, the device may select the network indication address with the highest priority. Where the user provided input to alert the device as to the presence of available network channels, the device may make a selection based upon that user input. Where the device detects the presence of network channels having characteristics specific to the corresponding technology, e.g. strength of signal, association and authentication procedures, and quality of service, the device may make the selection based upon one or more criteria, such as the network channel offering the highest quality of service, most reliable strength of signal, or lowest access cost.

Upon making the selection, a packet data communications connection request is sent. The packet data communications request includes the network identification parameter selected in step 103. Recall from the discussion above that in a traditional general packet radio service system, the device transfers a pre-programmed general packet radio service access point name to establish a switched packet data connection. The look-up table (200) of the present invention essentially causes an application within device to think it is establishing a switched packet data connection with a pre-programmed source by substituting a general packet radio service access point name associated with an available network channel selected from the look-up table (200). Where the selected network channel does not support, for example, a packet data protocol context establishment, any initiation request transmitted by an application within the device will be confirmed upon availability of the alternate data path selected from the table (200). Thus, the application within the device, and potentially the device itself to the network, initiates a data connection by transmitting a data connection initiation request that includes the network indication address selected from the look-up table (200) based upon the available network channels. In one exemplary embodiment, data connection initiation request comprises a request to establish a packet data protocol-context data connection with a servicing general packet radio service support node.

To fully establish a switched packet data connection, like a packet data protocol-context data connection, the device will receive an acknowledgement in response to transmitting the data connection initiation request. At decision 105, the device checks to see whether an acknowledgement has been received. Where one has not been received, for instance in the situation where a user defined priority dictates that a particular network channel be selected whether present or not, the device may optionally select another network indication address at step 106. Additionally, where an acknowledgement has not been received due to condition such as the inability to reach a particular server or a malfunctioning data connection or server, the device may optionally select another network indication address. This may be, for example, the next highest priority network indication address or the network identification address in the table with the next best quality of service among the available data paths. The device then retransmits a data connection initiation request with that network indication address at step 107, and checks for an acknowledgement at step 108.

Where an acknowledgement has been received in response to transmitting the packet data communications connection initiation request, as is the case at step 109, in one embodiment, the acknowledgement will include a handle. Such a handle is used, for example, to bind a TCP socket in the establishment of a data connection. The handle is read from the acknowledgement at step 109. The device then uses the handle to bind the TCP socket for packet data exchange with the network at step 110.

Sometimes, optionally in accordance with the invention, the device will detect a new available network channel while a switched packet data connection is on-going. For example, where a user has an established connection with a service provider's wide area network and enters his home having a wireless local area network, it may be advantageous to switch from the wide area network to the wireless local area network to achieve lower data transfer costs or higher data transfer throughput. In those situations, the device may check to see whether an existing data connection is present at decision 111. If there is, the device may switch the existing packet data communications connection to the new packet data communications connection at step 112. The device then begins transferring switched packet data at step 113.

Turning now to FIG. 3, illustrated therein is one exemplary embodiment of a portable, electronic device 300 in accordance with the invention. Exemplary devices include mobile telephones, two-way radios, personal digital assistants, portable computers and pagers. The device includes a microprocessor 301 and associated memory 302. The microprocessor 301 serves as the central control unit of the device and executes instructions stored in memory 302 as embedded firmware.

The device 300 includes a communication module 303 operable with the microprocessor 301. The communication module, which may comprise a series of instructions within the embedded firmware, is configured to initiate a switched packet data connection by transmitting an initiation request comprising an access point name. The communication module may further include radio-frequency modulation and transmission circuitry, antenna and associated hardware for wirelessly communicating with the various networks.

The device 300 also includes a processing module 304 operable with the communication module 303. The processing module 304 is capable of determining an availability and a desirability of network channels that are compatible with the electronic device 300.

Also, as noted above, the device 300 includes a look-up table 305 comprising at least one network channel and at least one corresponding network gateway address. When the processing module 304 determines the availability of network channels, it selects a corresponding network gateway address from the look-up table 305. The communication module 303 then transmits a request to initiate the data connection. As also noted above, the request to initiate the data connection includes the corresponding network gateway address selected from the look-up table 305.

In one embodiment, the device 300 optionally includes a switching module 306 capable of transferring an existing data connection from a first network gateway address to a second network gateway address. Such a handoff could occur when the processing module 304 determines a change in availability of operating network channels or a change in the device configuration.

Figure 4:
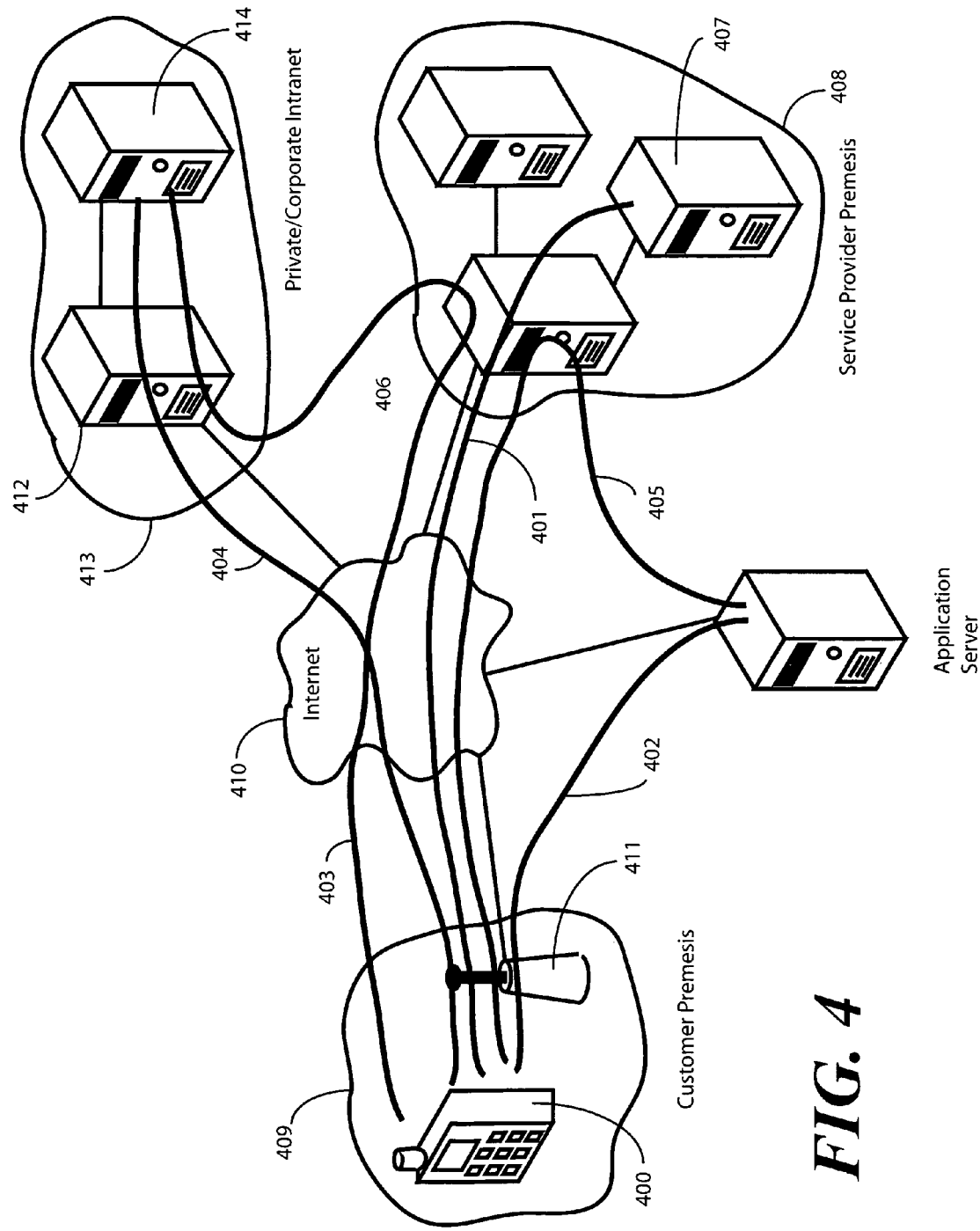
FIG. 4 illustrates exemplary network channels that may be used by an electronic device in accordance with the invention.

Now that the method and device have been described, an operating example is in order. Turning to FIG. 4, illustrated therein are various network channels that may be used to establish a switched packet data connection between a device 400 and a network in accordance with the invention.

The first network channel 401 is where the device 400 accesses application servers 407, e.g. e-mail servers, hypertext transfer protocol servers and the like, through a service provider's Intranet 408 by way of a virtual private network (VPN) established with a security gateway 406. The service provider's security gateway 406 may have locally stored security policies that allow the device 400 to access only a limited number or type of servers. Such a restriction may make connections to other networks desirable.

A second network channel 402 occurs where the device 400 uses a wireless local area network 409 for switched packet data connectivity. Where the wireless local area network 409 is connected to, for example, the Internet 410, the device is able to connect through a wireless local area network node 411 without having to use a virtual private network tunnel through a service provider's security gateway 406.

A third network channel 403 may occur where a user has access to a privately provided security gateway 412, one example of which may be a corporate Intranet 413. The corporate Intranet 413 may include its own secure, fire walled application servers 414. As with the second channel 402, this channel 403 may be established without the need of going through a virtual private network tunnel to a service provider's gateway 406.

A fourth network channel 404 may occur where the device 400 uses a service provider's IP infrastructure to access a privately provided security gateway 412. A fifth network channel 405 may occur where a service provider limits device 400 access to, for example, the Internet by requiring the device 400 to establish a virtual private network tunnel with the service provider's security gateway 406, which in turn assigns the device 400 an IP address.

To facilitate all of these network channels, the look-up table of the present invention maps the various access point names required to establish switched packet data connections with the corresponding networks. The device 400 selects an appropriate access point name from the look-up table and initiates the data connection. Where successful, connection handle is returned that corresponds to an Internet protocol connection that was obtained from the selected network channel after a virtual private. network tunnel was established with an appropriate security gateway.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of establishing a data connection between a communication device and a network, the method comprising the steps of:
   a. determining available network channels that are compatible with the communication device;
   b. selecting from a list of network indication addresses a network indication address corresponding to the available network channels including a particular network channel, wherein the list of network indication addresses corresponding to the particular network channel include a plurality of entries of respective different network indication addresses, where each entry of the plurality of entries has a network indication address that corresponds to a different type of routing with a different type of network; and
   c. initiating the data connection by transmitting a data connection initiation request comprising the network indication address.

2. The method of claim 1, wherein the step of determining the available network channels comprises determining a number and availability of data paths through which the data connection may be established.

3. The method of claim 2, wherein the step of determining the available network channels is completed by an operation selected from the group consisting of receiving input from a user and detecting nearby network gateway nodes.

4. The method of claim 2, wherein the list of network indication addresses comprises a look-up table of access point names, with each access point name having a corresponding data path associated therewith.

5. The method of claim 4, wherein the look-up table is arranged according to a user-defined priority.

6. The method of claim 5, wherein the corresponding data paths associated with the network indication addresses are selected from the group consisting of local area network connection data paths, wireless service provider connection data paths, virtual private network connection data paths, secured gateway connection node data paths, private intranet connection data paths, servicing general packet radio service support node data paths, World Wide Web connection data paths, and Internet connection data paths.

7. The method of claim 2, further comprising the step of receiving an acknowledgement response in response to transmitting the data connection initiation request.

8. The method of claim 7, wherein when a first data connection is unavailable, further comprising the steps of:

a. selecting from the list of network indication addresses a second network indication address corresponding to a second available data path; and b. initiating the data connection by transmitting a second data connection initiation request comprising the second network indication address.

9. The method of claim 8, wherein when an acknowledgement response is not received, further comprising the steps of:

a. selecting from the list of network indication addresses a second network indication address corresponding to a second available data path; and b. initiating the data connection by transmitting a second data connection initiation request comprising the second network indication address.

10. The method of claim 3, wherein the data connection initiation request comprises a request to establish a packet data protocol-context data connection with a general packet radio service network node.

11. A system for establishing a data connection between an electronic device and a network, the system comprising:

a. a communication module configured to initiate the data connection by transmitting an initiation request comprising an access point name;

b. a processing module operable with the communication module, the processing module being capable of determining an availability of network channels that are compatible with the electronic device; and c. a look-up table comprising at least one network channel including a particular network channel, and corresponding network gateway addresses, wherein the list of network gateway addresses corresponding to the particular network channel include a plurality of entries of respective different network gateway addresses, where each entry of the plurality of entries has a network gateway address that corresponds to a different type of routing with a different type of network;

wherein the processing module determines an availability of network channels and selects a corresponding network gateway address from the look-up table; and wherein the communication module transmits a request to initiate the data connection, the request to initiate the data connection comprising the corresponding network gateway address selected from the table.

12. The system of claim 11, wherein the available network channels comprise access to an available data connection, further wherein the look-up table comprises a plurality of network channels and a corresponding plurality of network gateway addresses.

13. The system of claim 12, wherein the plurality of network channels and corresponding plurality of network gateway addresses are arranged according to a user-specified priority.

14. The system of claim 11, further comprising a switching module capable of handing an existing data connection from a first network gateway address to a second network gateway address when the processing module determines a change in an operating network channel.

15. The system of claim 11, wherein the communication module and processing module are disposed within a portable, electronic device selected from the group consisting of mobile telephones, two-way radios, personal digital assistants, portable computers and pagers.

16. A method for establishing a packet data communications connection through a data path selected from a plurality of available data paths, the method comprising the steps of:

a. referencing a look-up table comprising a plurality of network identification parameters, each set of network identification parameters including a network channel and a corresponding network indication address, the network channels associated with the plurality of network identification parameters including a particular network channel, wherein the list of network indication addresses corresponding to the particular network channel include a plurality of associated sets of network identification parameters having respective different network indication addresses, where each associated set of the plurality of associated sets has a network indication address that corresponds to a different type of routing with a different type of network;

b. selecting a network identification parameter based upon a criterion selected from the group consisting of user input, detected available data paths and a user-configured priority; and c. transmitting a packet data communications connection request, the packet data communications request comprising the network identification parameter.

17. The method of claim 16, wherein the look-up table comprises at least a first network identification parameter and a second network identification parameter, wherein the first network identification parameter comprises a wide area network access point name, further wherein the second network identification parameter comprises a local area network access point name.

18. The method of claim 17, wherein the packet data communications connection initiation request comprises a request to establish a packet data protocol-context data connection with a servicing general packet radio service support node.

19. The method of claim 16, further comprising the step of receiving an acknowledgement in response to transmitting the packet data communications connection initiation request, wherein the acknowledgement comprises a handle.

20. The method of claim 19, further comprising the step of employing the handle to bind a TCP socket for packet data exchange with the network.

21. The method of claim 16, further comprising switching an existing packet data communications connection to a new packet data communications connection after transmitting the packet data communications connection request.

* * * * *